Sept. 23, 1958 C. A. SHOULTS 2,853,399
PROTECTIVE MATS
Filed May 9, 1956

INVENTOR
Clyde A. Shoults
BY Wm. T. Wofford
ATTORNEY

United States Patent Office 2,853,399
Patented Sept. 23, 1958

2,853,399

PROTECTIVE MATS

Clyde A. Shoults, Fort Worth, Tex.

Application May 9, 1956, Serial No. 583,722

5 Claims. (Cl. 154—49)

My invention relates to protective mats and more particularly to portable mats designed to protect special surfaces from damage by workmen and objects during maintenance and repair operations.

My invention is especially applicable to protection of wing and fuselage surfaces of modern aircraft during maintenance and repair operations. The wing and fuselage surfaces of some modern aircraft, and especially aircraft designed to attain supersonic speeds are comparatively delicate, and must be carefully protected against deformation, puncture, and surface scratching. At the same time it is necessary that workmen walk on these surfaces to carry out maintenance and repair operations.

It is accordingly a general object of my invention to provide a portable mat which is capable of protecting special surfaces against damage during maintenance and repair operations.

More specifically it is an object of my invention to provide a portable mat which will afford aquate protection to the wing or fuselage surface of a supersonic aircraft during maintenance and repair operations.

Another object of my invention is to provide a protective mat which shall act to dissipate shock impacts in a manner such that they will not be transmitted in harmful form through the mat.

Another object of my invention is to provide a portable protective mat which shall incorporate a high degree of shock transmission resistance and yet shall be of lightweight construction.

Another object of my invention is to provide a durable portable protective mat which shall incorporate a high degree of shock transmission resistance and yet shall be foldable into a compact form.

These and other objects are effected by my invention as will be apparent from the following description taken in accordance with the accompanying drawing, forming a part of this application in which.

Figure 1:
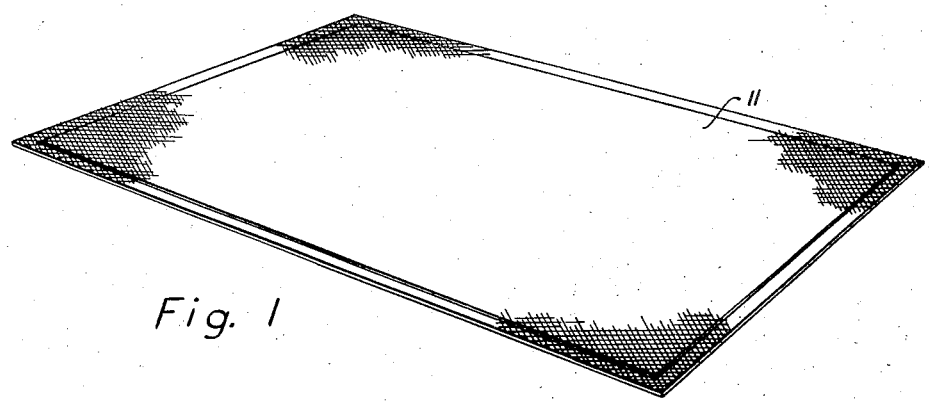
Fig. 1 is a perspective view of a complete protective mat constructed in accordance with a preferred embodiment of my invention.
Figure 2:
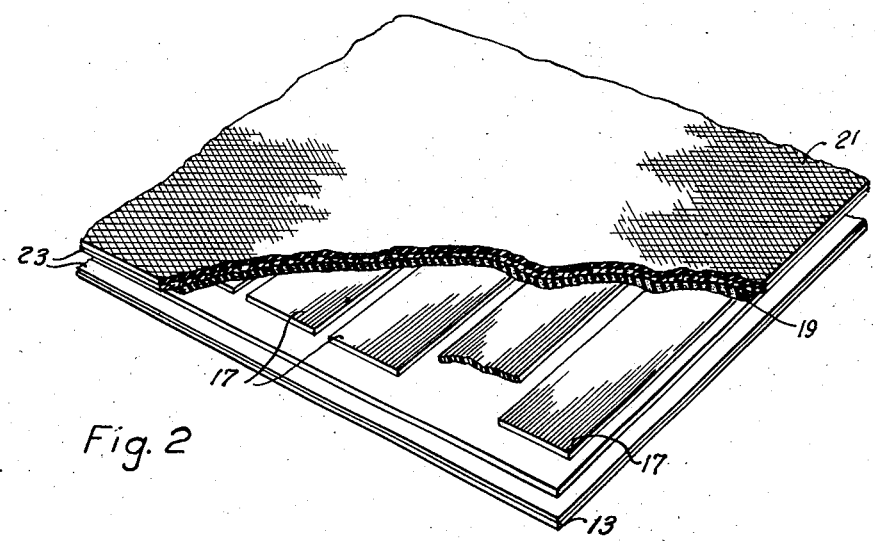
Fig. 2 is an enlarged perspective cut-away view of a corner portion of the mat of Fig. 1.
Figure 3:
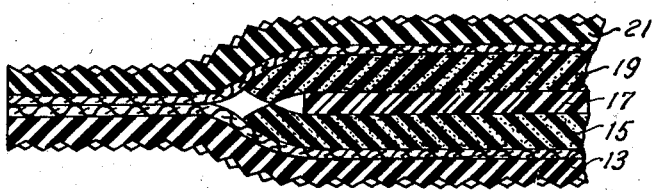
Fig. 3 is an enlarged partial section view of the mat of Fig. 1.

Referring now to the drawings it is apparent from Figs. 2 and 3 that the mat 11 is made up of several layers of materials which are sandwiched together to form the completed mat. The layers of material shown by Fig. 3 will for convenient reference be designated herein as the first 13, second 15, third 17, fourth 19, and fifth 21 layers looking from bottom to top in the drawing. The first and fifth layers 13, 21 of material are identical. These layers are sheet rubber, preferably oil and fuel resistant neoprene, having a cloth backing 23 on the inner surface to reinforce the rubber and add to its tear resistance, and having a non-skid outer surface, preferably in the form of small pyramidal figures as shown. The second and fourth layers 15, 19 of material are also identical. These layers are sponge sheet rubber, preferably neoprene. The third and central layer 17 is thin stiff strong shatter resistant material, preferably a glass fibre reinforced plastic. The third layer is preferably in the form of flat strips 17 lying transverse to the long dimension of the finished mat and separated just sufficiently to allow the mat to be folded. Each layer of the material is securely bonded to the adjacent layer or layers with a suitable adhesive in a manner well known to those skilled in the art. The outside edge of the mat is formed by allowing the first and fifth layers 13, 21 to extend beyond the intermediate layers so that these layers are bonded together to give the finished mat a beveled edge effect.

A convenient size for the finished mat is about 3 feet by six feet. Preferred thicknesses for the layers are: first and fifth layers, approximately .062 inch; the second and fourth layers, approximately .125 inch; the third layer, approximately .062 inch. The width of the plastic slats 17 may be approximately two inches if the mat is to be rolled for storage, or approximately one foot if the mat is to be folded for storage. None of the foregoing dimensions is critical, and they are given by way of example only.

In practice mats 11 are laid out to fully cover the surface to be protected, for example a wing surface. The non-skid features of the mat outer surfaces hold the mat securely on the protected surface and also provide sure footing for workmen. The mat outer layers 13, 21 also function to protect the mat from oil and fuel damage and to lend durability. The second layer 15 serves as a secondary shock absorber. It also serves to separate the third layer from the protected surface and allows for some deflection of the third layer without indenting the protected surface. The third layer 17 is the primary shock resistor. It acts to prevent dropped objects from penetrating the mat, and it also spreads the effect of small area or impact shocks such as would be caused by dropping a heavy tool or the like. The third layer further serves to distribute the weight of a workman over a larger area. The finished mat can be rolled or folded into a compact package because all other layers act as hinges for the third layer. The fourth layer 19 functions similarly to the second layer and in addition protects the third layer from shatter-tending small area impacts and also serves as a fatigue cushion for the workmen.

It will be apparent from the foregoing that I have provided a mat having excellent surface protecting qualities, and which is durable, oil and fuel resistant, non-skid, lightweight, and foldable to make a compact package for storing. Further, the mat is reversible so that the workman cannot place a wrong side up.

While I have shown my invention in only one form it will be apparent to those skilled in the art that it is not so limited, but is susceptible of various changes and modifications without departing from the spirit thereof.

I claim:

1. A protective mat construction comprising, a central layer of stiff glass reinforced plastic material, a layer of sponge rubber on both sides of said central layer, a rubber layer on the outside of each said sponge rubber layer, with every said layer bonded to every adjacent layer.

2. A protective mat construction comprising, a central layer of stiff glass reinforced plastic material in the form of slats spaced from each other at their longitudinal edges, a layer of sponge rubber on both sides of said central layer, a rubber layer on the outside of each said sponge rubber layer, with every said layer bonded to every adjacent layer.

3. A protective mat construction comprising, a central layer of stiff glass reinforced plastic material in the form of slats, a layer of sponge rubber on both sides of said central layer, a rubber layer on the outside of each said sponge rubber layer, said rubber layers having non-skid outer surfaces and clothbacked inner surfaces, with every layer bonded to every adjacent layer, said slats being separated at their longitudinal edges just sufficiently that the other layers can act as hinges for folding the mat.

4. A protective mat for use in the protection of surfaces of thin-skinned aircraft during construction and maintenance operations comprising, a central layer of flat stiff fibre reinforced plastic material, a layer of sponge rubber on both sides of said central layer, a rubber layer on the outside of each said sponge rubber layer, with every layer bonded to every adjacent layer.

5. A protective mat for use in the protection of surfaces of thin-skinned aircraft during construction and maintenance operations comprising, a central layer of flat stiff fibre reinforced plastic material in the form of slats, an intermediate layer of sponge rubber on both sides of said central layer, a rubber layer on the outside of each said intermediate layer, with every layer bonded to every adjacent layer, said slats being separated at their longitudinal edges just sufficiently that the other layers can act as hinger for folding the mat.

References Cited in the file of this patent

UNITED STATES PATENTS

| | | |
|---|---|---|
| 567,985 | Le Clair | Sept. 22, 1896 |
| 2,244,956 | Miller et al. | June 10, 1941 |
| 2,270,902 | Rubissow | Jan. 27, 1942 |
| 2,459,758 | Flint | Jan. 18, 1949 |
| 2,522,612 | Harben | Sept. 19, 1950 |

FOREIGN PATENTS 657,923      Great Britain      Sept. 26, 1951
(Corresponding U. S. A. 2,469,084, May 3, 1949)